US008751374B2

(12) United States Patent
Graves (10) Patent No.: US 8,751,374 B2
(45) Date of Patent: Jun. 10, 2014

(54) SYSTEM, METHOD, AND APPARATUS FOR MANAGING WASTEWATER TREATMENT INSTALLATION

(75) Inventor: Gregory D. Graves, Milan, OH (US)

(73) Assignee: Service Pro Monitoring, LLC, Norwalk, OH (US)

( * ) Notice: Subject to any disclaimer, the term of this patent is extended or adjusted under 35 U.S.C. 154(b) by 1349 days.

(21) Appl. No.: 12/232,504

(22) Filed: Sep. 18, 2008

(65) Prior Publication Data

US 2009/0083180 A1    Mar. 26, 2009

Related U.S. Application Data

(62) Division of application No. 11/584,516, filed on Oct. 23, 2006, now Pat. No. 7,734,379.

(51) Int. Cl.
*G06Q 40/00* (2012.01)

(52) U.S. Cl.
USPC .................................. 705/38; 705/35; 705/39

(58) Field of Classification Search
USPC ....................................................... 705/35, 38
See application file for complete search history.

(56) References Cited

U.S. PATENT DOCUMENTS

| | | | |
|---|---|---|---|
| 4,857,182 A | 8/1989 | Jackson | |
| 5,234,601 A | 8/1993 | Janke et al. | |
| 5,479,338 A | 12/1995 | Ericksen et al. | |
| 5,835,376 A * | 11/1998 | Smith et al. | 701/117 |
| 5,960,416 A * | 9/1999 | Block | 705/34 |
| 5,983,198 A * | 11/1999 | Mowery et al. | 705/22 |
| 5,991,746 A * | 11/1999 | Wang | 705/40 |
| 5,995,939 A | 11/1999 | Berman | |
| 6,186,893 B1 * | 2/2001 | Walker et al. | 463/20 |
| 6,349,289 B1 * | 2/2002 | Peterson et al. | 705/34 |
| 6,377,190 B1 * | 4/2002 | Saar | 340/870.02 |
| 6,845,336 B2 | 1/2005 | Kodukula et al. | |
| 7,149,701 B2 * | 12/2006 | McKinney | 705/7.15 |
| 7,177,831 B1 * | 2/2007 | O'Shaughnessy et al. | 705/36 R |
| 7,463,878 B2 * | 12/2008 | Kumar et al. | 455/406 |
| 8,023,425 B2 * | 9/2011 | Raleigh | 370/252 |
| 2002/0069188 A1 * | 6/2002 | Anvekar et al. | 705/412 |
| 2002/0143596 A1 * | 10/2002 | Carmody | 705/8 |
| 2004/0019511 A1 * | 1/2004 | McKinney | 705/8 |
| 2004/0230455 A1 | 11/2004 | McKinney et al. | |
| 2005/0021359 A1 * | 1/2005 | McKinney | 705/1 |
| 2005/0192877 A1 * | 9/2005 | Smith et al. | 705/34 |
| 2007/0106525 A1 * | 5/2007 | McKinney | 705/1 |
| 2008/0120162 A1 * | 5/2008 | Carmody | 705/8 |

OTHER PUBLICATIONS

Description of VeriComm® Control Panels (VCOM), downloaded Jun. 28, 2006 from Orenco Systems, Inc. On-line, Product Catalog.
Description of VeriComm® Monitoring System, downloaded Jun. 28, 2006 from Orenco Systems, Inc. Website.
VeriComm® Monitoring System Technical Data Sheet, published by Orenco Systems, Inc. Jun. 2002.

* cited by examiner

*Primary Examiner* — Kirsten Apple
(74) *Attorney, Agent, or Firm* — Bacon & Thomas, PLLC (57) ABSTRACT

Apparatus for managing a residential wastewater treatment system includes an in situ control unit that monitors an individual system. The control unit provides local control and alarms, and also sends status reports and/or alarms to a remote monitoring center via a telemetry device. The remote monitoring center makes information concerning the individual system available through a website.

6 Claims, 11 Drawing Sheets

| search | service due | panel info | active alarms | FAQ | accounts
  add new subscriber
  view edit subscriber
  suspend/restore account
  list/search accounts
history
  specific account
  all active accounts
  all suspended accounts
reports
  add service report
  alarm state
  systems due for service
  expiring contracts
downloads
  service pro instructions
  general service form
  contract renewal form
  service pro quick start
administration
  distributor
  service providers
  user internet acess
  invoice statement Add New Subscriber
Account No. 1197

* denotes input required
First Name *
John
Last Name *
Doe
Street Address *
123 Main St.
City *
Norwalk
State/Province *
OH-OHIO
Zip/Postal Code *
44857
County *
HURON
Country *
USA Enter/Switch Account
User:

home    contact off    help    log off

SYSTEM, METHOD, AND APPARATUS FOR MANAGING WASTEWATER TREATMENT INSTALLATION

This application is a Division of nonprovisional application Ser. No. 11/584,516, filed Oct. 23, 2006.

BACKGROUND OF THE INVENTION

1. Field of the Invention

This invention relates to a system, method, and apparatus for managing a residential wastewater treatment system.

The apparatus of the invention includes a control and monitoring unit that includes a variety of different sensor inputs and circuitry enabling the unit to be adapted to a variety of different treatment installation configurations. A telemetry device is included to provide automatic notification to a remote monitoring center of the need for service, and regulatory monitoring, but with provision for delayed notification to allow for self-correction of a condition and avoid unnecessary service calls. The sensor circuitry detects open circuits as well as overcurrents, is temperature insensitive, and includes programmable trip points and alarm levels for optimal installation flexibility and user convenience.

The system of the invention includes a plurality of monitoring and control units for respective individual decentralized advanced wastewater treatment installations which are linked to a remote monitoring station. The individual monitoring and control units may include the features described above, although the system of the invention may also be applied to other monitoring or control units. Monitoring data sent to the remote monitoring station affords access to information provided by the control units as well as account management functions. The account management functions include a consolidated billing function that bills owners of individual installations for monitoring and/or service costs in a way that facilitates payment to multiple entities, such a distributor and/or repair service provider, a monitoring service that notifies the distributor or service provider should an alarm condition occur, and an administrator.

The method of the invention also involves monitoring and control of individual wastewater treatment installations, and may include the steps of monitoring for conditions that require service, providing a local alarm and waiting for the condition to be resolved without a service call, using the telemetry device to notify a monitoring service if the condition persists, and initiating a service call as necessary. In addition, the method of the invention may include steps associated with the above-described consolidated billing function.

2. Description of Related Art

A conventional wastewater disposal system supplies the wastewater to a drain field that settles out solids and minimally treats the wastewater. In many cases, however, insufficient space or porous soil is available to support the conventional disposal system, in which case some sort of wastewater treatment is required. Such wastewater treatment systems use components such as aerators to force air into the wastewater to support aerobic sewage-digesting bacteria, and/or pumps to move the wastewater through filters, pretreatment tanks, surge chambers, baffles, and the like, before disposing of the treated wastewater. A wide variety of such advanced wastewater treatment systems are available from different manufacturers.

A problem with advanced systems is that they are used by owners who lack the knowledge, ability, or desire to properly maintain the system. Components of the system can malfunction, presenting serious health and environmental hazards, without the owner even being aware that a malfunction has occurred. As a result, monitoring and regular maintenance is critical. Despite the potential advantages of aerobic or other advanced treatment methods, including less groundwater pollution than conventional septic tanks, and enabling development of sites that are too small to support a conventional drain field, many localities have simply prohibited the systems. Others subject advanced systems to burdensome regulatory requirements, increasing costs and inconvenience. Aerobic systems may allow a site to be developed that could not otherwise support a conventional septic system.

In order to overcome these problems, NSF and ANSI have proposed a standard, known as NSF/ANSI Standard 40, that provides detailed specifications for residential wastewater treatment systems, including calls for regular maintenance as well as monitoring to ensure compliance with treatment standards. A number of systems have been developed to meet this standard, with the monitoring and compliance portion of the standard being met by using the Internet to monitor individual units.

An example of a wastewater treatment installation designed to comply with NSF/ANSI standard 40 is offered by Orenco Systems, Inc. The Orenco Systems wastewater treatment installation includes a control and monitoring panel, described at www[.]vericomm[.]net, that automatically notifies a remote monitoring center of alarm conditions via the Internet. When a malfunction is detected, the VeriComm control panel immediately issues an alert, resulting in the remote monitor scheduling a service call. The homeowner can access control functions and clear alarms, but only through the website operated by the remote monitor.

Other wastewater treatment installations that include remote monitoring are disclosed in U.S. Patent Publication Nos. 2002/0143596 (Carmody), and 2004/0019511, 2005/0021359, and 2005/00230455 (all to McKinney). In general, these publications focus on the monitoring and regulatory compliance aspect of the systems, and in particular on notification of service providers of the need for service, and reporting of service calls/conditions. The Carmody publication, for example, concerns assignment of service providers and reporting of service calls, while the McKinney publication adds automatic monitoring not only of the treatment system, but also service personnel visiting the system. A general listing of treatment units that comply with Product Standard 40 is found at www[.]nsf[.]org/certified/wastewater/Listings[.]asp?TradeName=&Standard=40.

There are several problems with conventional Product Standard 40 compliant monitoring systems:

First, most are only capable of being used in connection with a specific system, and cannot be retrofitted onto existing systems, or adapted to different equipment configurations.

Second, conventional remote monitoring systems do not allow self-correction of conditions that trigger an alarm, leading to wasted service calls and/or an extended waits to resolve problems. For example, an overcurrent condition may be caused by debris on the aerator shaft, which necessitates service, but on the other hand may also be the result of high water in the treatment system. The high water creates an additional drag on the aerator, increasing the operating current. This problem may be caused by a short term hydraulic flow surge such as emptying a bath tub, which is a very temporary condition that resolves itself and does not significantly affect the treatment process. If the condition simply resolves itself without intervention, then an automatic service call may not be necessary. The Orenco, Carmody, and McKinney systems cited above appear to initiate a call-out immediately upon detecting a problem, which can result in nuisance calls where the condition is temporary and allowing it to clear itself does not significantly affect the treatment process.

Third, while many monitoring systems check for overcurrents resulting from excessive load on a system component motor, such as an aerator or pump motor, prior systems do not check for undercurrents at the control panel, which is indicative of an open circuit condition. This could be caused by a broken wire, loose or corroded wire or a junction not making good contact, or any number of malfunctioning electrical components. It could also be caused by an owner or service provider leaving a unit unplugged. The conventional failure to monitor open circuit conditions or undercurrents means that it is possible for potentially serious system or component failures to go unreported.

Fourth, present control panels do not allow for multiple overload/trip points for overcurrent conditions. Instead, current panels utilize a circuit breaker or motor starter type device which establishes a trip point based on a specified amount of current received for a specified period of time. These may not be optimum time/trip points for a particular aerator or pump motor, and in addition are subject to temperature changes. It would be desirable to be able to adjust the trip point to a particular system, to establish multiple trip points for different alarm levels, and to enable compensation for temperature (or to make the circuit breaker/alarm circuit temperature insensitive). For example, a very high current might require an alarm condition within a very short time, while a moderately high current could justify a longer wait before triggering the alarm.

Finally, there is the problem that once the service contract required by Standard 40 and/or other regulations expires, it is difficult to get consumers to renew the contract or sign with another service provider, due to the inconvenience of having to deal with multiple parties having different signing procedures and billing systems. The service provider may, for example, be a small local company. Consumers resent having to pay the service provider and also a monitoring service, or even for paying for "sewage" treatment in the first place, or may simply neglect to sign with one or the other. Conversely, it is difficult for the small service provider to collect regular payments. These problems can be alleviated by providing a centralized billing arrangement that is simple for the consumer, and that consolidates all payments into a single invoice. On the other hand, if a consumer decides not to renew a monitoring contract, it should be possible to decommission the control panel so that it functions as a stand-alone control panel with local alarms but no remote monitoring.

SUMMARY OF THE INVENTION

It is accordingly a first objective of the invention to provide an apparatus and system for, and a method of controlling a wastewater treatment installation that overcomes the above-described limitations of conventional wastewater treatment systems.

It is a second objective of the invention to provide an apparatus for controlling a wastewater treatment installation that is modular in nature and/or easily adaptable to different treatment installation configurations, and/or that is capable of being retrofitted onto a variety of existing wastewater treatment system configurations.

It is a third objective of the invention to provide an apparatus, system, and method for controlling a wastewater treatment installation that includes remote monitoring and automated notification of the need for service, but that also provides for delayed notification of an alarm condition to allow for self-correction of the condition, in order to avoid unnecessary service calls.

It is a fourth objective of the invention to provide an apparatus and system for control and monitoring of a wastewater treatment installation that is capable of detecting open circuits or undercurrents anywhere in the installation.

It is a fifth objective of the invention to provide an apparatus and system for control and monitoring of a wastewater treatment installation that provides different trip points and/or alarm levels, thereby enabling the system to distinguish between different levels of urgency and also to enable adaptation of the apparatus to different types of installation, and further that is temperature insensitive.

It is a sixth objective of the invention to provide a system and method of monitoring a wastewater treatment installation that provides the user with a single consolidated billing arrangement that facilitates payment by an owner of the installation while distributing the payment to a monitoring service, service provider or distributor, and administrator.

It is a seventh objective of the invention to provide an apparatus for control of a wastewater treatment installation that provides for remote monitoring following installation for a predetermined period, and remote decommissioning and stand-alone operation if a monitoring contract is not renewed or paid for following the predetermined period.

These objectives are accomplished, in accordance with the principles of a preferred embodiment of the invention, by providing control and monitoring units (hereinafter control units) for individual wastewater treatment systems that are designed to be installed in a residence or other building for monitoring and controlling an individual wastewater treatment system such as, but not limited to, a NSF/ANSI Standard 40 residential waste treatment installation, and that contains or is connected to circuitry for carrying out various monitoring and control functions, including the generation of alarms as necessary, as well as remote communications with a central office. The central office maintains a website for accessing information received from the control unit.

In a preferred embodiment of the invention, the control unit is a microprocessor based platform that is programmed to control waste treatment equipment according to programmed run cycles and either an adjustable or non-adjustable clock. An adjustable clock can be used to provide a minimum run time for the equipment, while a non-adjustable clock can be used to control fixed on/off cycles. The equipment may be in the form of an aerator or any other equipment, such as a pump, that requires monitoring and control. In addition, the control center includes various alarm indicators responsive to monitoring and diagnostic circuitry/programming.

In order to operate the control unit, the control unit includes an interface panel featuring a time clock adjusting knob, a reset button, and various visual indicators including a power light for indicating whether the unit is being supplied with power, a main alarm light for indicating system malfunctions, a phone light to indicate whether a call is being made from the unit using the telemetry device, an equipment status indicator light, and auxiliary inputs.

The interface panel of the control unit is arranged to be situated within a sealed housing accessible through an access door. A weatherproof lens may be provided in the access door so that the alarm light is visible even when the door is closed and latched. In addition, the reset button may be made accessible through the closed door by extending it through an opening and boot made of a weatherproof resilient material. When an alarm condition occurs, momentarily pressing the reset button will re-energize the operating circuit and cause the micro-processor to attempt to restart the malfunctioning equipment. If the alarm condition continues, an audible alarm is activated and telemetry circuitry within the unit notifies a remote monitoring center of the specific alarm condition. If the audible alarm has been activated, pressing the reset button silences the audible alarm for a predetermined period, such as 48 hours, while the visual alarm remains active.

The control unit includes a current sensing circuit which constantly monitors equipment operating current when the equipment is programmed to be running. If the operating current is above or below the parameters established for normal operation, the alarm circuit is activated.

In addition, the control unit includes a plurality of auxiliary inputs for monitoring accessory equipment as part of the complete wastewater treatment system. Preferably, the auxiliary alarm inputs are configured for either a low voltage circuit, a high voltage circuit, normally open relay contacts and/or normally closed relay contacts.

The control unit monitors all wastewater treatment systems and auxiliary equipment operating conditions. In the event that the current sensing circuit indicates a sustained high current condition, low current condition, or open motor condition, power to the malfunctioning equipment is interrupted and the visual alarm is activated. The control center attempts to automatically restart the equipment at intervals for a predetermined period. Manually pressing the reset button also attempts a restart. If the equipment successfully restarts any time during the two hour period, the visual alarm deactivates and the aerator returns to a normal operation.

If the equipment does not return to normal operation, or another fault is found, the telemetry system of the control unit communicates with a remote monitoring center, for example, over a standard residential telephone line, and transmits the data to the remote monitoring center. The center includes diagnostic software or personnel for allowing identification and diagnosis of any alarm condition in the individual treatment system or accessory equipment connected to the auxiliary inputs. For example, the remote control center may detect excessive load on a component motor, a high water condition, or an open circuit anywhere in the control unit, equipment circuitry, or connecting cables/wires. This diagnosis is then used as the basis for scheduling of service and generation of reports to be posted on the website and accessible by interested parties with proper authorization.

The invention also provides a number of improved telemetry features, including the ability to sense whether the telephone system at each individual location utilizes "pulse" or DTMF technology, disconnection of a call when the line is being used and resumption of the call after the line is free, and repeated dial out and delivery of alarms until a person physically goes to the site and resets the panel. The call interruption and requirement for physical reset features are believed to be unique, at least in the context of telemetry associated with wastewater treatment control, to the panel of the preferred embodiment. The former feature has the advantage of not tying up the telephone line in case an overriding emergency is occurring, while the former ensures that an alarm condition will be adequately checked out. The Vericomm panel described above has periodically repeating alarms, but they can be remotely turned off via the website without visiting the panel.

The invention also provides a unique method for collecting and distributing fees from the owners of onsite treatment installations to a web-based remote monitoring service, an administrator, the distributor of the onsite treatment equipment used in the installation, and/or a maintenance/repair service provider. The service provider may be a separate entity from the distributor or may be part of the distributor's offered services.

The NSF/ANSI Standard 40 requires that service be included by the manufacturer/distributor for the first two years, and an ongoing service policy offered that provides for periodic inspection and maintenance offered thereafter. The present invention facilitates renewal by providing the owner with a single, convenient payment that not only covers the distributor providing services/maintenance or a separate service provider, but also a monitoring service that would be responsible for making sure that the service provider is notified should an alarm condition occur or should a periodic status call not be received, and that has all data posted to a website for viewing by the administrator, the service provider and a regulatory body. In addition, the single payment covers administration costs through fees to the administrator.

The payment/administration method of the invention results in increased renewal of service contracts, protecting health and the environment, and spares the distributor of the burden of invoicing and collecting fees directly from owners, and distributing fees to the monitoring service and administrator. In addition, it enables the distributor to establish the price and amount of profit for providing the monitoring service included with routine maintenance. Those skilled in the art will appreciate that this payment method could also be applied to maintenance on demand in the absence of an extended service contract, to septic tanks and other types of onsite systems with different service requirements, and to systems other than aerobic treatment units, for those that utilize pump stations.

DETAILED DESCRIPTION OF THE PREFERRED EMBODIMENTS

Figure 1:
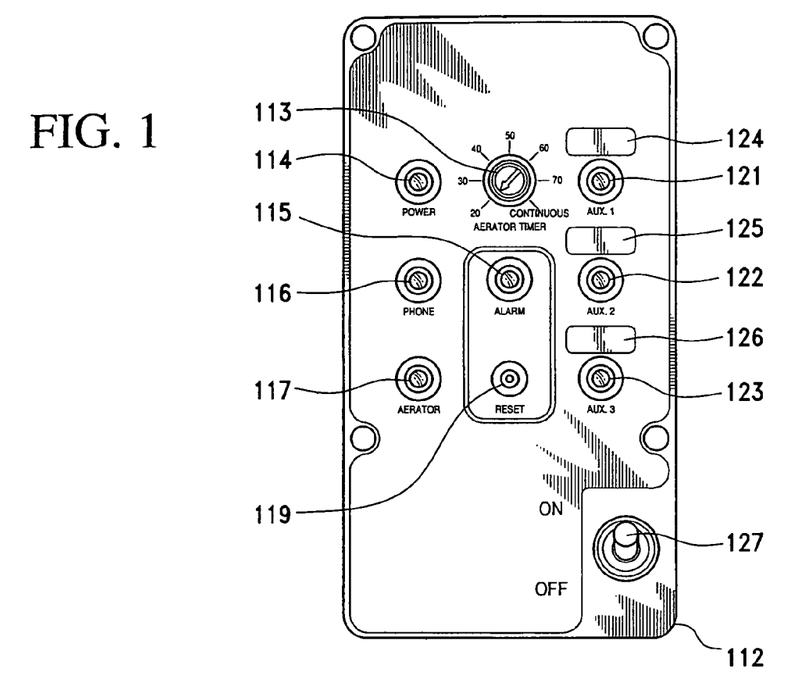
FIG. 1 is a front view of the main user interface panel of a control unit constructed in accordance with the principles of a preferred embodiment of the invention.
Figure 2:
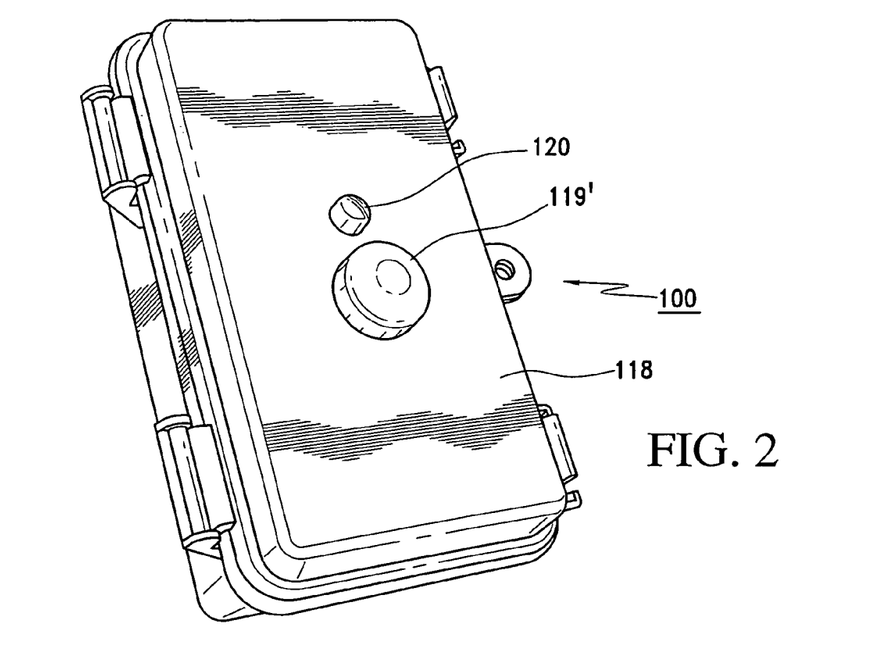
FIG. 2 is a perspective view of the control unit with a closed access door through which an alarm light is visible and an access button extends.

FIG. 1 is a front view of the main user interface panel of a control center or control unit 100 constructed in accordance with the principles of a preferred embodiment of the invention. FIG. 2 is a front view of the control unit with a closed access door 118. A reset button 119 extends through the door and an alarm light is visible through a window or lens 120 provided in the door.

Figure 3:
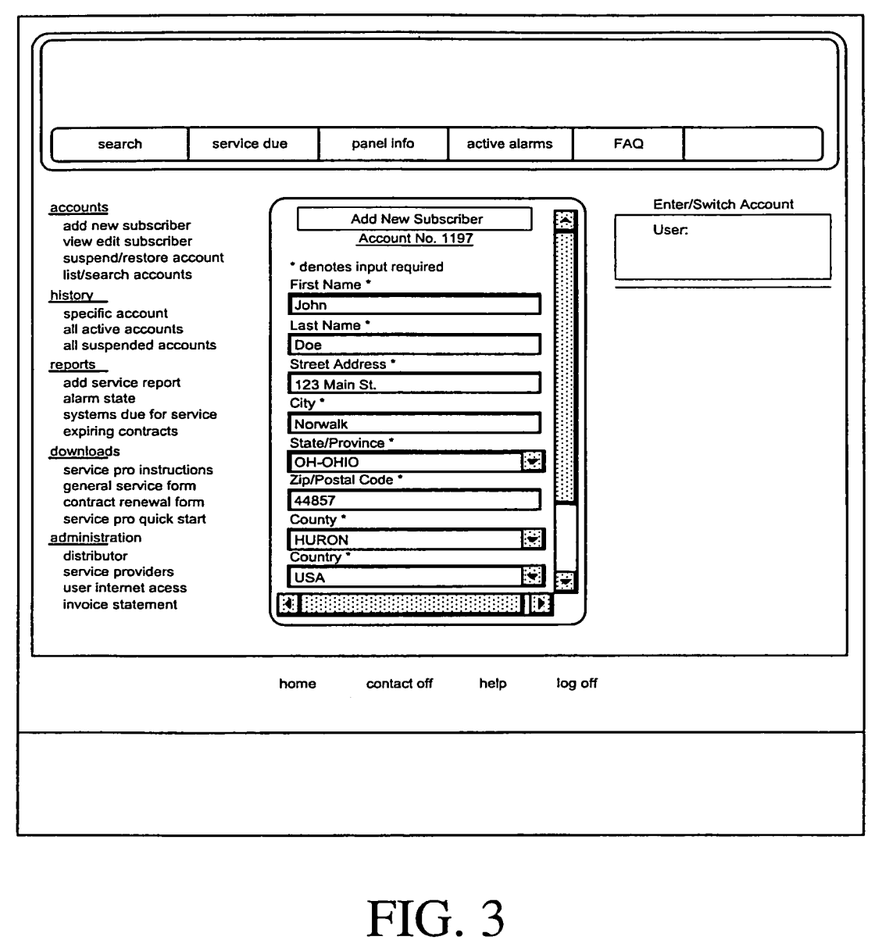
FIG. 3 is a screen shot of a webpage through which account information and reports on a particular system may be accessed.

Control unit 100 is designed to be installed in or in the vicinity of a residence or other building for monitoring and controlling an individual wastewater treatment system such as a residential septic tank system. As will be described below, control unit 100 contains or is connected to circuitry for carrying out various monitoring and control functions and to provide alarms, and includes a built in telemetry device for communicating with a central office. Information received from the control unit 100 may be accessed through a website, a screen shot of which is illustrated in FIG. 3, the website optionally being maintained by the central office or another party to which the central office forwards the information.

Control unit 100 is a microprocessor based platform that is programmed to control waste treatment plant equipment (not shown) according to programmed run cycles and either an adjustable or non-adjustable clock. An adjustable clock can be used to provide a minimum component run time, while a non-adjustable clock can be used to control fixed on/off cycles. In either case, the microprocessor controls the various alarm indicators responsive to monitoring and diagnostic circuitry and internal programming.

In the illustrated example, the wastewater treatment component is, by way of example, an aerator, although those skilled in the art will appreciate that the apparatus of the invention may be adapted to control equipment other than aerators, such as pumps, and to be used in waste treatment installations that do not require an aerator.

In the embodiment illustrated in FIG. 1, a control unit interface panel 112 includes a time clock knob 113 for adjusting the time clock, a power light 114 for indicating whether the unit is being supplied with power, a main alarm light 115 for indicating system malfunctions, a phone light 116 to indicate whether a call is being made from the unit using a telemetry device, an aerator status indicator light 117, the reset button 119, auxiliary input lights 121-123 with optional label pads 124-126, and a power switch 127.

Panel 112 is arranged to be situated within the housing of the control unit 100 and is, as noted above, covered by access door 118 illustrated in FIG. 2. A weatherproof lens 120 is preferably provided in the access door 118 so that the alarm light 115 is visible even when the door 118 is closed and latched. In addition, the reset button 119 may be made accessible through the closed door, as shown in FIG. 2, by extending it through an opening and covering it with a boot 119' made of a weatherproof resilient material such as polyvinyl chloride (PVC). During an aerator alarm condition, momentarily pressing the reset button 119 through the boot 119' re-energizes the operating circuit and causes a micro-processor to attempt to restart the aerator. If the alarm condition continues, an audible alarm is activated and telemetry circuitry within the control unit 100, described in more detail below, notifies a remote monitoring center of the specific alarm condition. If the audible alarm has been activated, pressing the reset button 119 silences the audible alarm for a predetermined period, such as 48 hours, while the visual alarm light 115 remains illuminated.

The control unit includes a current sensing circuit, described in detail below, which constantly monitors aerator operating current when the aerator is programmed to be running and compares the current with reference values or set points. The set points are established by programming and therefore may be varied to adapt the control unit to different equipment. If the aerator operating current is above or below the parameters established for normal aerator operation, the alarm circuit is activated. The sensing circuit is preferably insensitive to changes in ambient temperature, and accurate to within 5% of the design parameters when operated in ambient temperatures from $-20°$ to $160°$ Fahrenheit.

The control center 100 also contains a plurality of auxiliary inputs for monitoring accessory equipment as part of the complete wastewater treatment system. In the preferred embodiment, as explained in more detail below, the number of auxiliary inputs is three, and the three auxiliary alarm inputs are configured for either a low voltage (5-24 VAC/DC) circuit, a high voltage (120 VAC) circuit, normally open relay contacts and/or normally closed relay contacts. Since the auxiliary inputs can be used with a variety of inputs, label pads 124-126 are provided to facilitate individual labeling of the corresponding indicator lights 121-123.

The control unit 100 monitors all wastewater treatment systems and auxiliary equipment operating conditions. In the event a current sensing circuit, described hereinafter, indicates a sustained high current condition, low current condition, or open motor condition, power to the aerator is interrupted and the visual alarm light 115 activates. Since the abnormal condition could be temporary or correctable by the owner, power may be restored upon manually pressing the reset button 119, the control center attempts to automatically restart the aerator at five minute intervals repeating up to 24 times for a period of two hours. If the aerator successfully restarts any time during the two hour period, the visual alarm light 115 deactivates and the aerator returns to a normal operation. In the event the restart attempts are unsuccessful, the audible alarm activates and the telemetry system calls the remote monitoring center and provides a communication describing the specific condition indicated. This notification may be repeated every 48 hours until the problem has been corrected. The specific alarm condition is immediately posted to a secure monitoring website represented by the webpage illustrated in FIG. 3.

Figure 4:
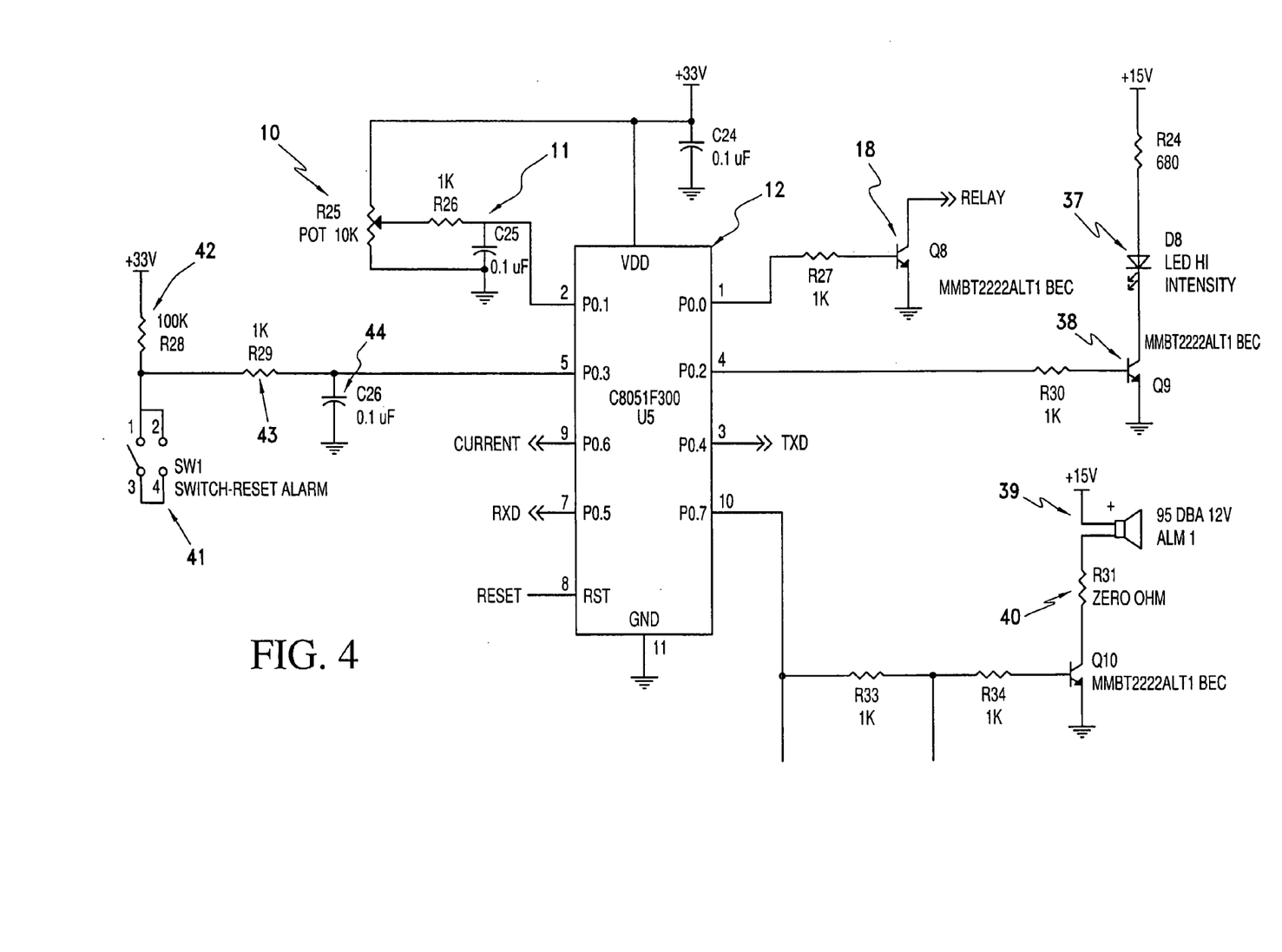
FIG. 4 is a schematic circuit diagram of a microprocessor-based control input and alarm circuit for the preferred control unit shown in FIGS. 1 and 2.

FIG. 4 shows a microprocessor control input and alarm circuit for use in the control unit 100 of the preferred embodiment. The time clock knob 113 shown in FIG. 1 operates a potentiometer 10 configured as an adjustable voltage divider connected to port 0, bit 1 pin of microprocessor 12 via resistor R26 and capacitor C25, which together form an electromagnetic interference (EMI) noise filter 11. As the time clock knob 113 is rotated in the clockwise direction, the output voltage presented to the microprocessor 12 input pin 2 increases from 0V to 3.3V. Pin 2 of the microprocessor 12 is configured an analog input. The microprocessor firmware reads the input voltage and sets the run time of the aerator motor proportional to the voltage measured. The minimum run time is 50% of the total cycle time of 60 minutes and the maximum run time is 100% of the total cycle time.

As illustrated, microprocessor 12 may be a C8051F300 U5 microprocessor, which is commercially available. It will be understood, however, that the invention is not limited to a particular microprocessor or micro-controller, or any other electrical or electronic component identified herein by model number, and that the associated input and output circuitry can be varied as necessary to support the choice of microprocessor.

Returning to the example shown in FIG. 4, the microprocessor 12 runs the aerator motor in response to the run time calculations made by firmware in the microprocessor. To turn the motor on, microprocessor 12 sets the output voltage at port 0, bit 0 to a logic high of approximately 3.3V. To turn the motor off, the output at port 0 bit 0 is driven to a logic low of close to 0V. When the output of port 0 bit 0 is driven high, transistor 18 is turned on and allows current to flow through the relay coil 14 of FIG. 5, which is connected to transistor 18 via the signal labeled "RELAY." This in turn causes the relay to energize and close the normally open contacts between pin 4 of the relay and points 1 and 6. Pin 4 of the relay is connected to the switched side of line L1. Pins 1 and 6 of the relay are connected through current sensing transformer 15 to the motor via jumper or power connector JH1 pin 3. Current flows from line L1 through relay coil 14 and transformer 15 and out to the motor. When the output of port 0 bit 0 of the microprocessor is driven low, transistor 18 is turned off and current is not permitted to flow through the relay coil 14. This causes the relay coil 14 to de-energize and open the normally open contacts between pin 4 of the relay and pints 1 and 6 of the relay, which interrupts the motor current and stops the motor.

FIG. 4 also shows an alarm output stage, which provides the primary means of communication to the user of the existence of an alarm condition. The visual alarm 115 described above in connection with FIG. 1 may be, but is not limited to, an ultra-bright LED 37. The presence of an alarm condition is indicated by flashing of the LED. The flash pattern is controlled by the microprocessor 12 to indicate various alarm codes to aid the user in determining the cause of the alarm or other type of error, such as an under current alarm or phone line error. The micro-controller drives the output to a logic high level when an alarm condition is present, which turns on transistor 38 and allows current to flow through the ultra-bright LED 37.

The preferred embodiment illustrated in FIG. 4 also includes an audible indicator in the form of a piezoelectric transducer 39. The port 0 bit 7 pin of microprocessor 12 is configured as an output. The microprocessor drives this output to a logic high level when an alarm condition is present. The logic high level turns on transistor 40 and allows current to flow through the piezoelectric transducer 39.

The reset button 119 is a momentary contact, normally open, push button switch, illustrated as switch 41 in FIG. 4. It is available to the user for various functions such as to clear or silence an alarm condition or to cause the microprocessor 12 to retry starting the motor and to abort call out attempts.

When switch 41 is open, resistor 42 pulls up pins 1 and 2 of the switch to a logic high level. This voltage is filtered by the combination of resistor 43 and capacitor 44 and are connected to the microprocessor 12 via port 0 pin 3, which is configured as a digital input. When switch 41 is pressed, pins 1 and 2 of the switch are connected to ground. This forces the voltage at the pins to a logic low level. The micro-controller reads this voltage and makes decisions based on the state of this voltage. Alarms can be cleared based on this signal transitioning to a logic low state. The modem can be enabled or disabled based on the length of time this switch is held in the closed position, and an alarm test mode may be initiated based on the length of time the switch is held in the closed position.

Figure 5:
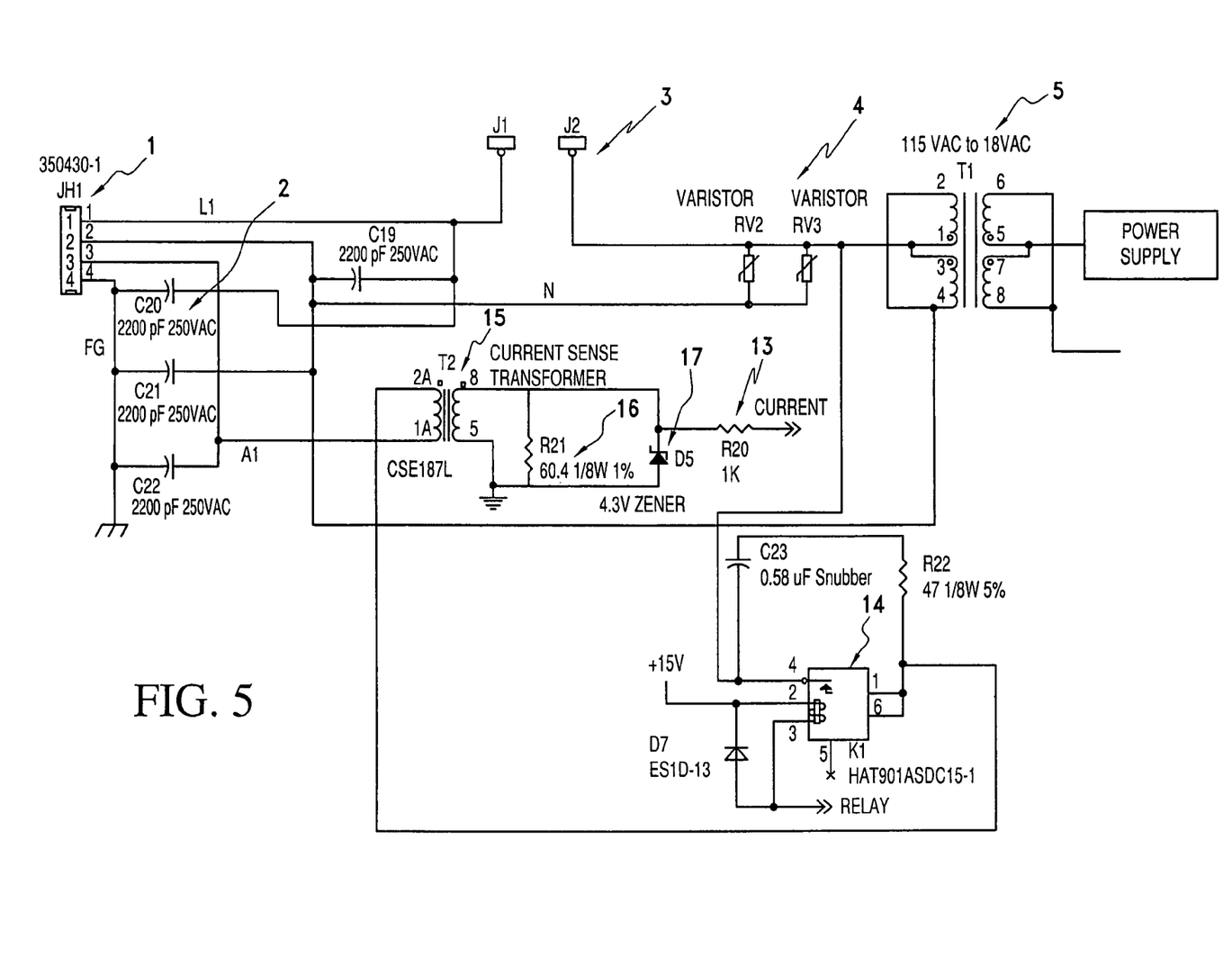
FIG. 5 is a schematic circuit diagram of an aerator motor control and current-sensing circuit for the preferred control unit.

FIG. 5 shows the current sensing circuitry used by the apparatus of the preferred embodiment. This stage is used by the microprocessor 12 to determine the condition of the aerator or other component motor and make alarm decisions based on the current measured. As described above, motor current flows through relay 14 and transformer 15. Transformer 15 is a current sensing transformer, which generates a small current through its output coil that is proportional to the large current flowing through the input coil. Resistor 16 across the output coil transforms this current into a voltage proportional to the motor current.

Since the current is AC and therefore flows in both directions, the output voltage of the transformer will be positive half the time and negative half of the time. Zener diode 17 prohibits the voltage during the negative half cycle from becoming more negative than about −0/7V to protect the micro-controller. The Zener diode 17 also prevents the positive voltage from becoming more positive than about 4.3V. This voltage is connected through resistor 13 to port 0 bit 6 of the microprocessor 12, which is configured as an analog input.

The microprocessor 12 reads the voltage at port 0 bit 6 and calculates the peak current flowing through the motor. Since the current is sinusoidal with the negative half cycles clamped at −0.7V by the Zener diode 17, the microprocessor 12 must read this input multiple times per second and use the highest value measured over that time period to determine the peak current. Since the current alarm trip points are defined as root mean squared (RMS) values, the microprocessor 12 uses trip points based on the relationship between peak values and RMS values of a sinusoidal signal. For a purely sinusoidal signal, the RMS value will be equal to the peak value divided by the square root of two. The firmware in the microprocessor 12 can generate an alarm based on the value of the current and the length of time that the current is below a low current value or above a high current value.

Figure 6:
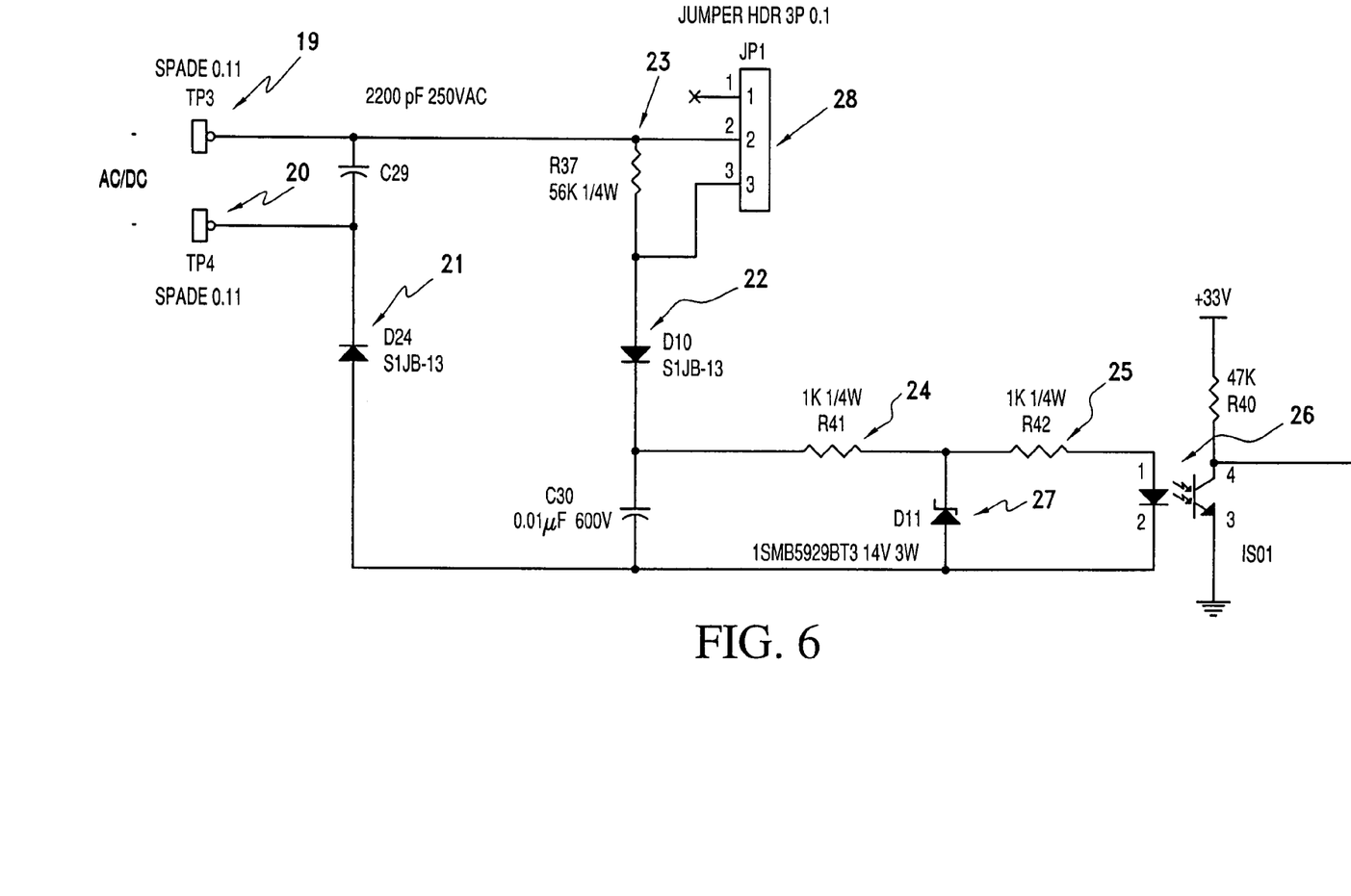
FIG. 6 is a schematic circuit diagram of an auxiliary voltage input circuit for the preferred control unit.
Figure 7:
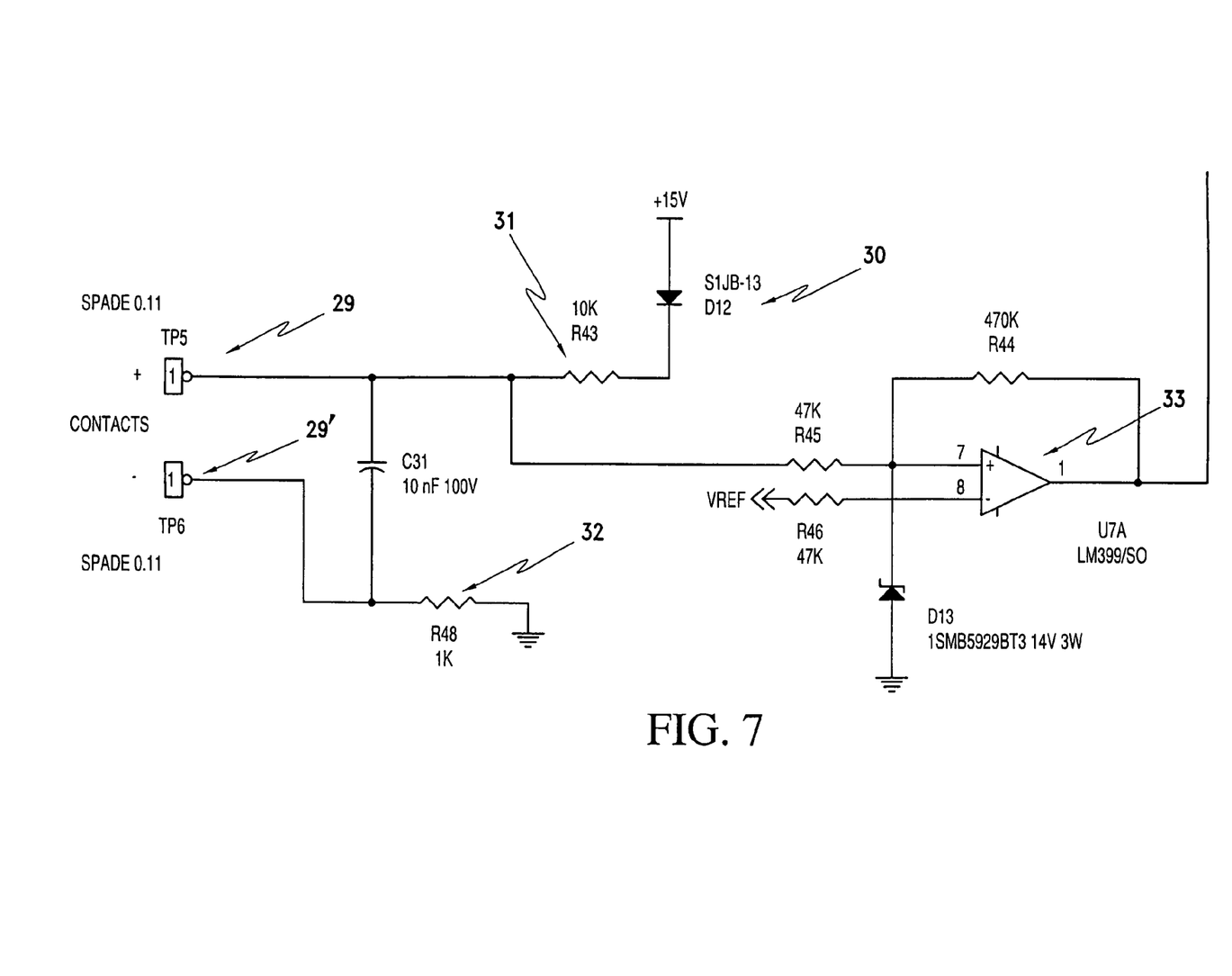
FIG. 7 is a schematic circuit diagram of an auxiliary relay input circuit for the preferred control unit.

The auxiliary alarm input stage illustrated in FIGS. 6 and 7 monitors externally connected alarm circuitry. This stage provides the capability to connect such devices as, by way of example and not limitation, effluent pumps, fluid level floats, disinfection system alarms, relays or other devices to the microprocessor 12. The microprocessor 12 will generate an alarm condition in response to any of the three auxiliary alarm inputs becoming active.

Each of the three auxiliary input circuits are identical and therefore only one such circuit will be described in detail. It will of course be appreciated that the number of auxiliary circuits may be more or less than three, and that the auxiliary circuits may also be omitted.

Each auxiliary circuit allows one of two types of inputs to be used. The two types of inputs are voltage inputs and relay contacts. A separate set of input connections are provided for each of these types of inputs.

Each auxiliary input circuit preferably also includes two jumpers to configure the circuitry for the voltage level to be applied and to allow flexibility in the polarity of the input signal applied, so that the alarm can be sounded when voltage is applied or removed, or when the relay is open or closed, depending on the nature of the auxiliary device.

As shown in FIG. 6, external voltage inputs may be applied to the connection points 19 and 20. The applied voltage may be AC or DC. When a DC voltage is applied, the positive terminal is terminal 19 and the negative terminal is terminal 20. Diodes 21 and 22 provide reverse polarity protection and half wave rectification of AC signals, and block any negative signals so that only the positive half of an AC signal is presented to the rest of the circuitry. For an AC signal, the voltage seen by the input circuitry will be 0V half of the time and the positive half of the AC signal the other half of the time.

Resistors 23-25 provide current limiting to the opto-isolator 26, while diode 27 provides over voltage protection to the opto-isolator 26. Opto-isolator 26 provides isolation of the input voltage from the rest of the circuitry.

A jumper placed on jumper header 28 allows a wide range of input voltages to be applied to the input terminals. For 115 VAC signals, by way of example and not limitation, the jumper is left off the jumper header or can be placed across pins 1 and 2 of the jumper. In this position, resistor 23 is left in the circuit and the current is limited to a reasonable amount for the opto-isolator. For voltages between 5V AC/DC and 24V AC or DC, the jumper is placed across pins 2 and 3 of jumper 28. In this position resistor 23 is bypassed so as to permit enough current to flow through the opto-isolator to allow the output to turn on. When the opto-isolator 26 turns on, the output terminal pin 4 thereof changes from a logic high state to a logic low state.

As shown in FIG. 7, relay contacts may be connected to the microprocessor 12 via connection points 29 and 29'. When the relay contact closes, current will flow from the 15V supply through diode 30, resistor 31, the relay contacts, and resistor 32 to ground. This current will cause the positive input terminal of a comparator 33 to drop below the voltage reference applied to negative input terminal of the comparator. This in turn causes the output terminal of the comparator to change from a logic high state to a logic low state. It will be appreciated that the relay inherently provides isolation to protect the microprocessor.

Figure 8:
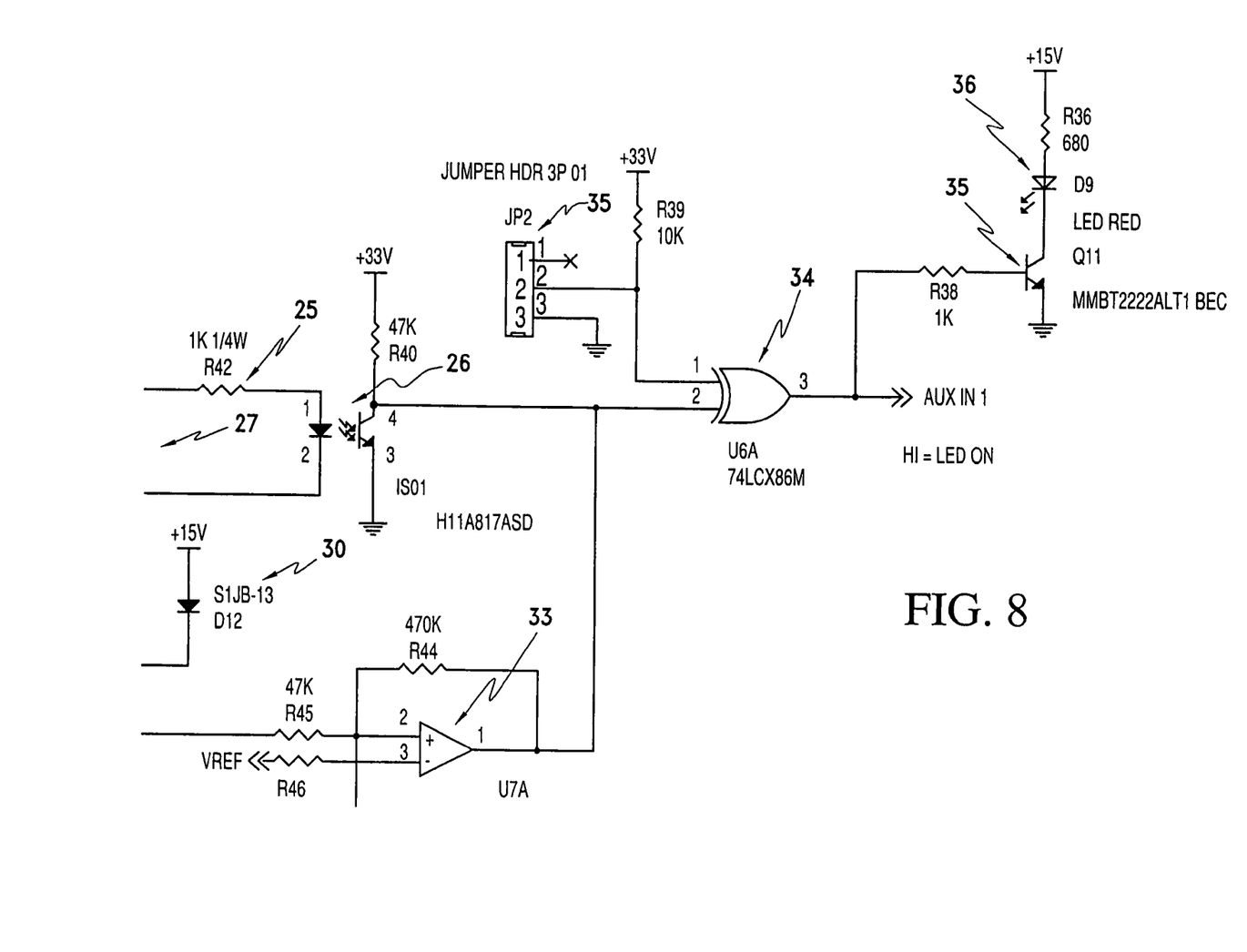
FIG. 8 is a schematic circuit diagram of an auxiliary input logic interface for the preferred control unit.

As shown in FIG. 8, the voltage input and the relay input both connect to the same logic interface circuitry. The logic interface circuitry includes an exclusive OR gate 34. Its output terminal pin is driven to a logic high state anytime the input terminal pins are at different logic levels. Since the voltage input and the relay input are each able to drive the logic level of the exclusive OR gate input terminal pin, the XOR gate 34 output will be driven high anytime the voltage or relay input circuitry causes the input pins of the XOR gate 34 to be at a different logic state. The logic level of input pin 2 of the XOR gate 34 is determined by the position of the jumper placed on jumper header 35. When the jumper is left off or placed across pins 1 and 2 of jumper header 35, pin 1 of the XOR gate 34 is pulled up to a logic high level. When the jumper is placed across pins 2 and 3 of jumper header 35, pin 1 of the XOR gate 34 is pulled down to a logic low level. In this manner the system may be configured to respond to active high or active low voltage inputs and to normally open or normally close the relay inputs. When the input logic levels of the XOR gate 34 do not match each other, the output of the XOR gate is driven high. This pin is connected to an input pin of a modem chip 45 shown in FIG. 9 so as to be read by the firmware of the modem chip as an indication of an auxiliary alarm. Driving the output of the XOR gate 34 to a high state also turns on transistor 35, which allows current to flow through the auxiliary alarm indicator LED 36, corresponding to one of lights 121-123 in FIG. 1, providing a visual indication of an alarm condition on either the voltage input or the relay input.

The telemetry system of the preferred embodiment communicates between the control unit and the remote monitoring center/website provider via a standard residential telephone line, although it is also within the scope of the invention to use other communication media, such as a wireless telephone network or satellite communication system. The telemetry system automatically senses whether the residential telephone service is a pulse or tone service and adjusts accordingly. If the residential telephone service is in use, the telemetry system continues to check the line use until a clear line is available and delivers the appropriate message to the remote monitoring center. If the telemetry system is in the process of communicating with the remote monitoring center, and the residential telephone is picked up, the telemetry system preferably disconnects until the line is again available. Upon confirmation by remote monitoring center that all sent data has been received, the control unit also disconnects.

Figure 9:
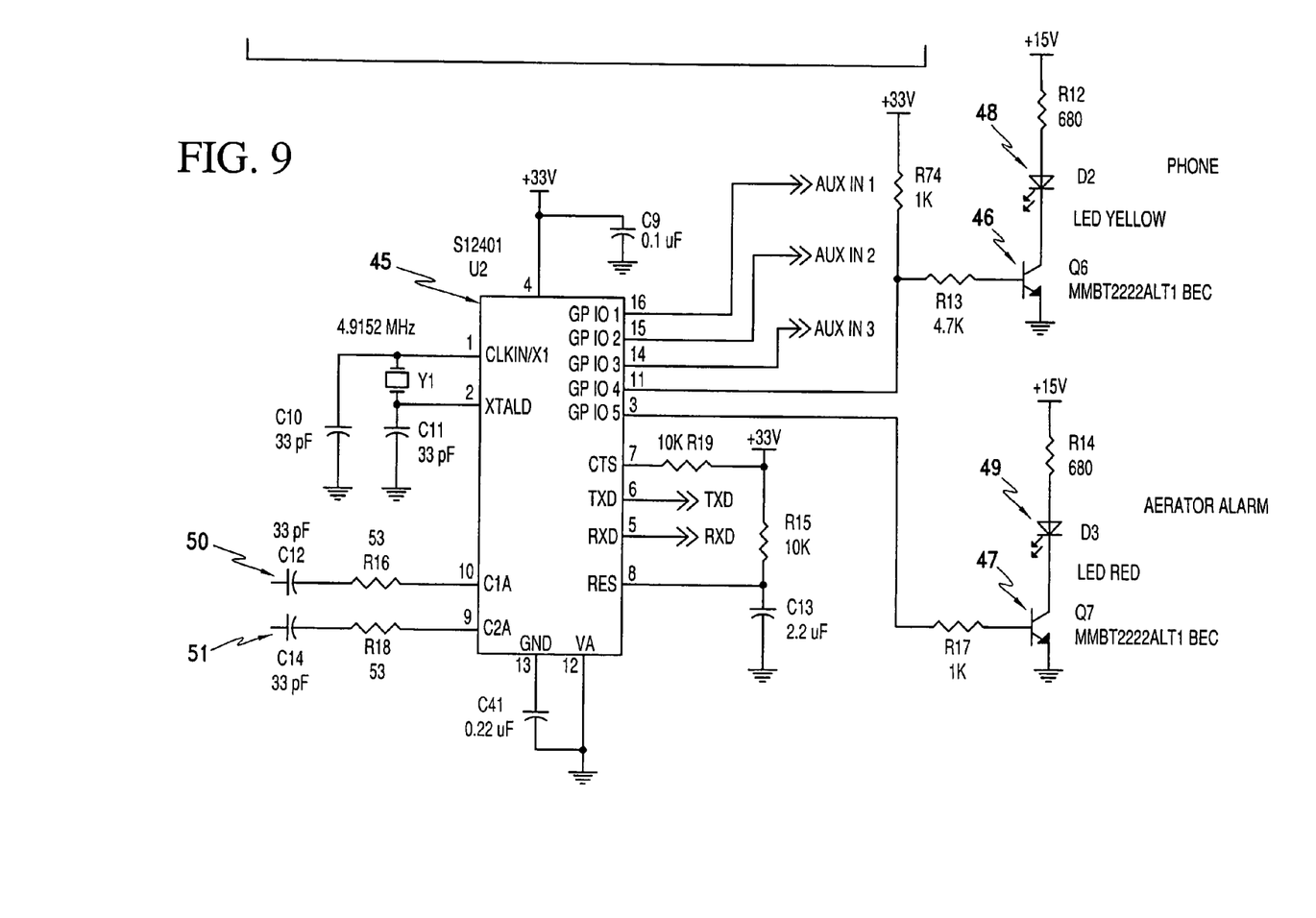
FIG. 9 is a schematic circuit diagram of a modem circuit for the preferred control unit.
Figure 10:
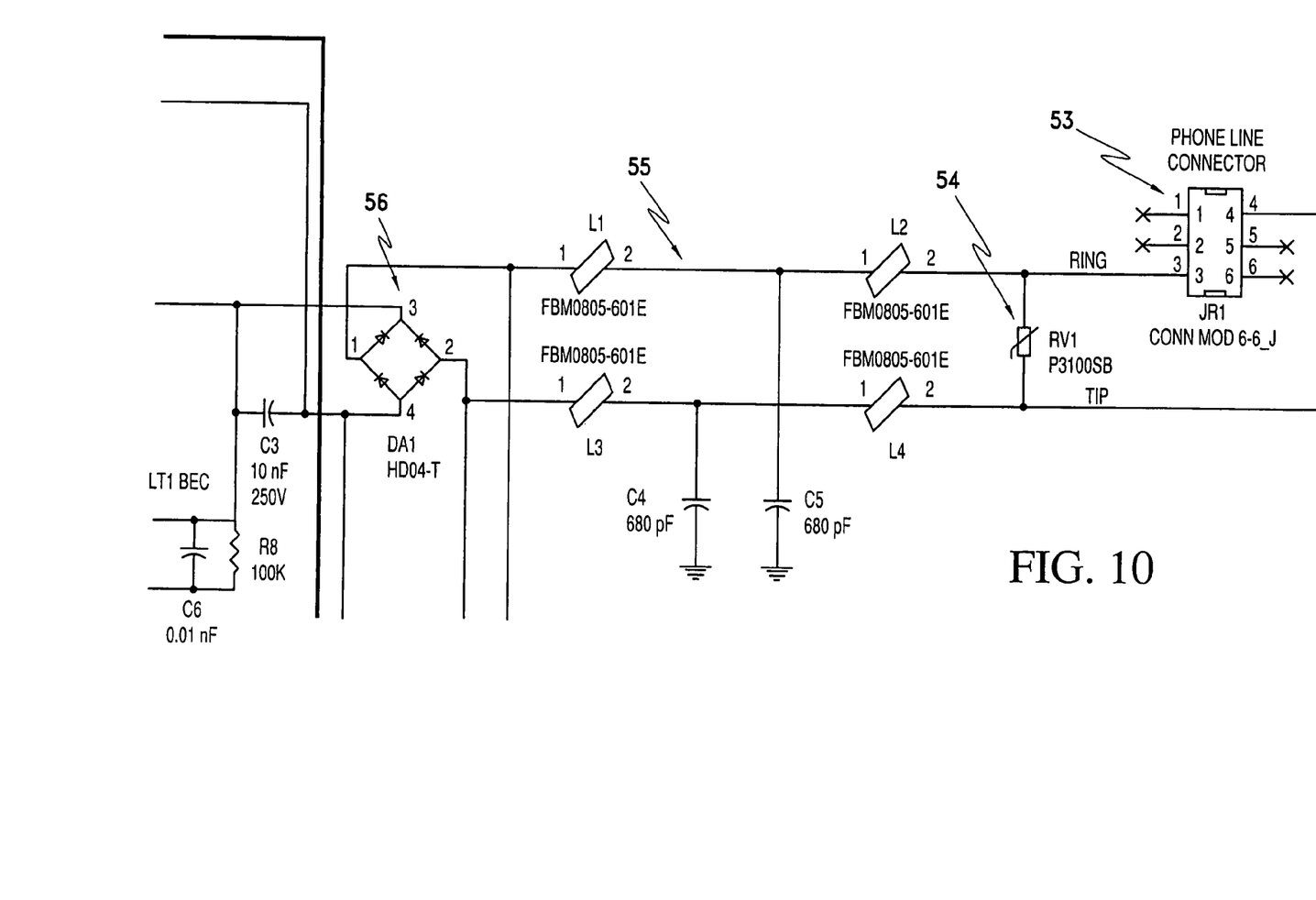
FIG. 10 is a schematic circuit diagram of a telephone line connector and filtering circuitry for the preferred control unit.
Figure 11:
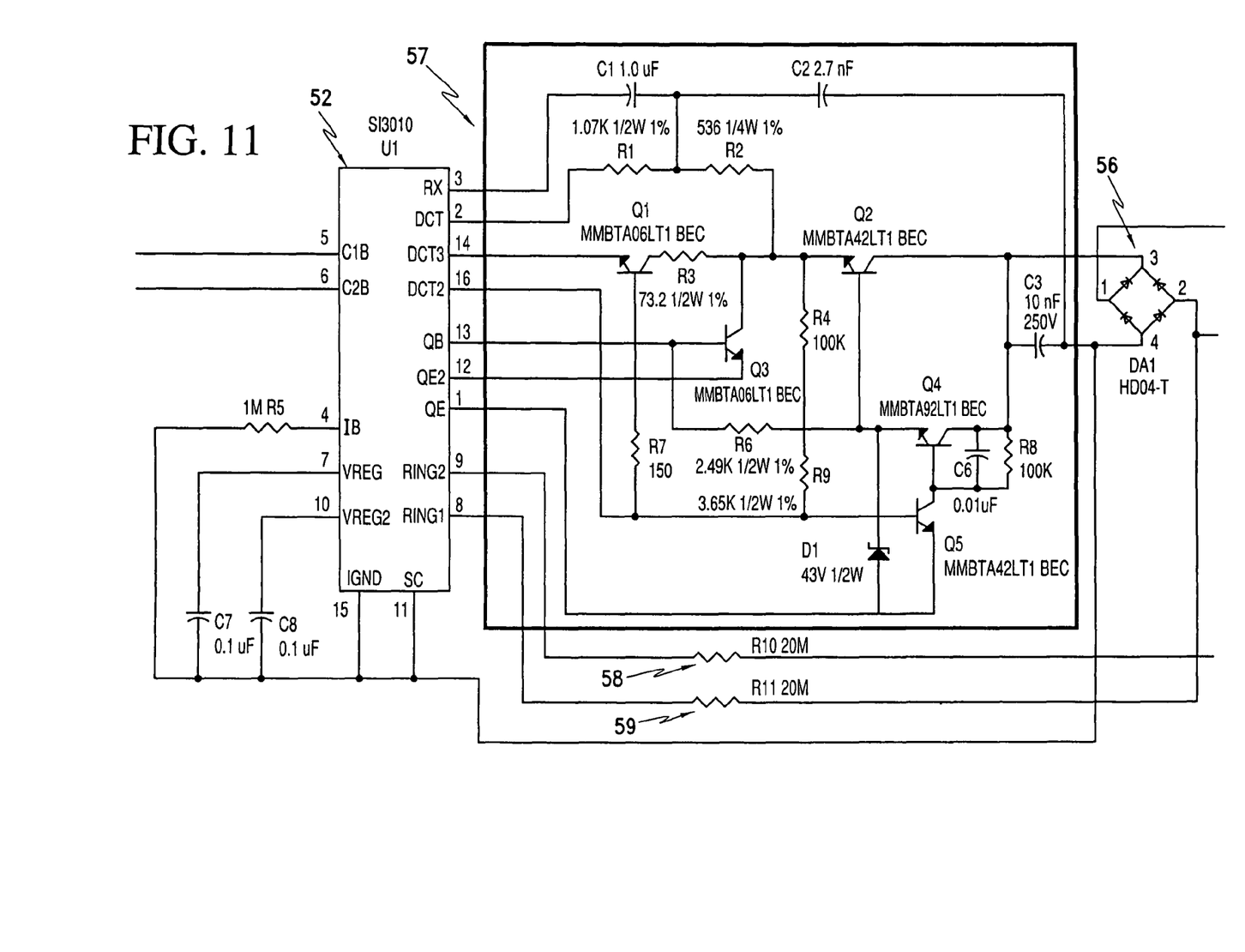
FIG. 11 is a schematic circuit diagram of a phone line control IC and DAA circuit for the preferred control unit.

The circuitry for the telemetry stage is illustrated in FIGS. 9-11. This stage is made up of two main circuits. The first is a modem circuit shown in FIG. 9 and the second is a telephone line control circuit illustrated in FIGS. 10 and 11. The modem circuit utilizes a commercially available modem chip 45 capable of communicating serially with the microprocessor 12. Two signal lines are used between the modem chip 45 and the microprocessor 12 for communication, the first line RXD (shown in FIG. 4) being for receiving data, and the second line TXD being for transmitting data. These lines are connected to the microprocessor port 0 bit 5 and port 0 bit 4, respectively. All modem functions are initiated by commands sent by the microprocessor 12 via the TXD line. The microprocessor sets up the registers within the modem chip 45 and initiates all communications to the phone line circuitry.

In order to monitor the auxiliary inputs described earlier, the microprocessor 12 reads a register within the modem chip 45 and the status of the modem 45 general purpose input/output (GPIO) bits 1, 2, and 3 are communicated back to the microprocessor 12. In order to change the state of two LEDs 48 and 49 (illustrated in FIG. 9) connected to the modem chip 45, which correspond to phone light 116 and aerator status indicator light 117 shown in FIG. 1, the microprocessor 12 writes data to a register within the modem chip. This register sets the GPIO bits 4 and 5 to a logic low level or a logic high level. Setting an output to a logic high level turns on transistor 46 or 47 connected to the respective LED 48 and 49 to turn the LED on. The aerator alarm LED 49 is illuminated to indicate to the user that the cause of an alarm is an aerator under current or over current state. The phone indicator LED 48 is illuminated to indicate that the system is currently accessing the telephone line. Communication to the telephone line control circuitry is achieved by the modem 45 ports C1A and C2A. Data is sent serially via these two pins. Isolation from the phone circuitry is achieved by isolation capacitors 50 and 51.

The telephone line control circuit shown in FIGS. 10 and 11 is made up of a telephone line control integrated circuit 52 and various discrete components interfacing directly with the telephone line. The telephone line control integrated circuit 52 may be, by way of example and not limitation, a Silicon Labs application specific IC model SI3010. The telephone line is accessed via connector 53. Voltage surges on Tip and Ring are suppressed by transient voltage suppressor 54. Noise is filtered by the combination of ferrites L1-L4 and capacitors C4 and C5 which form a low pass Pi filter. Signals sent out to the phone line or received from the phone line are rectified by a diode bridge 56. Signals sent out or received on the phone line are conditioned by an FCC-approved data access arrangement (DAA) design represented by block 57. The DAA consists of the analog circuits that interface to the phone line's higher voltages per FCC requirements. Busy, off hook, and intrusion detection functions are handled by monitoring the voltage across the Tip and Ring signals. These voltages are fed back to the telephone line control circuit 52 via resistors 58 and 59.

The control unit may also include DC and AC power circuits. These circuits are well-known and therefore are not described in detail herein.

In case of a service call, the alarm test feature can be used to notify the remote monitoring center of the service call, at the beginning and end of the service visit. The remote monitoring center provides a time and date stamped record of the service visit and posts it to the website.

The control unit may also provide status calls at predetermined intervals, such as 30 days, to indicate normal operation. If such a call is not received, then the service provider may be notified to arrange a site visit.

The control unit preferably also provides diagnostic functions, and in particular the identification and diagnosis of an alarm condition of the aerator or accessory equipment connected to the auxiliary inputs. Each alarm condition is identified by a programmed alarm code. Excessive load on the aerator, a high water condition or a service requirement for the waste treatment system results in the control unit telemetry system reporting an over current condition to the monitoring center. When the control unit detects an open electrical circuit anywhere in the control center/aerator circuit, including a broken service wire between the control unit and the aerator, open motor windings within the aerator, or an aerator that has been inadvertently left unplugged. Any situation where the diagnostic function measures an open motor condition results in the control unit reporting this condition to the remote monitoring center. Any of these conditions results in automatic restart attempts with a predetermined period in order to provide time for a temporary condition to correct itself. If the condition has not been corrected within the predetermined time, the audible alarm is activated and notification to the remote monitoring center with the specific alarm code takes place.

Figure 12:
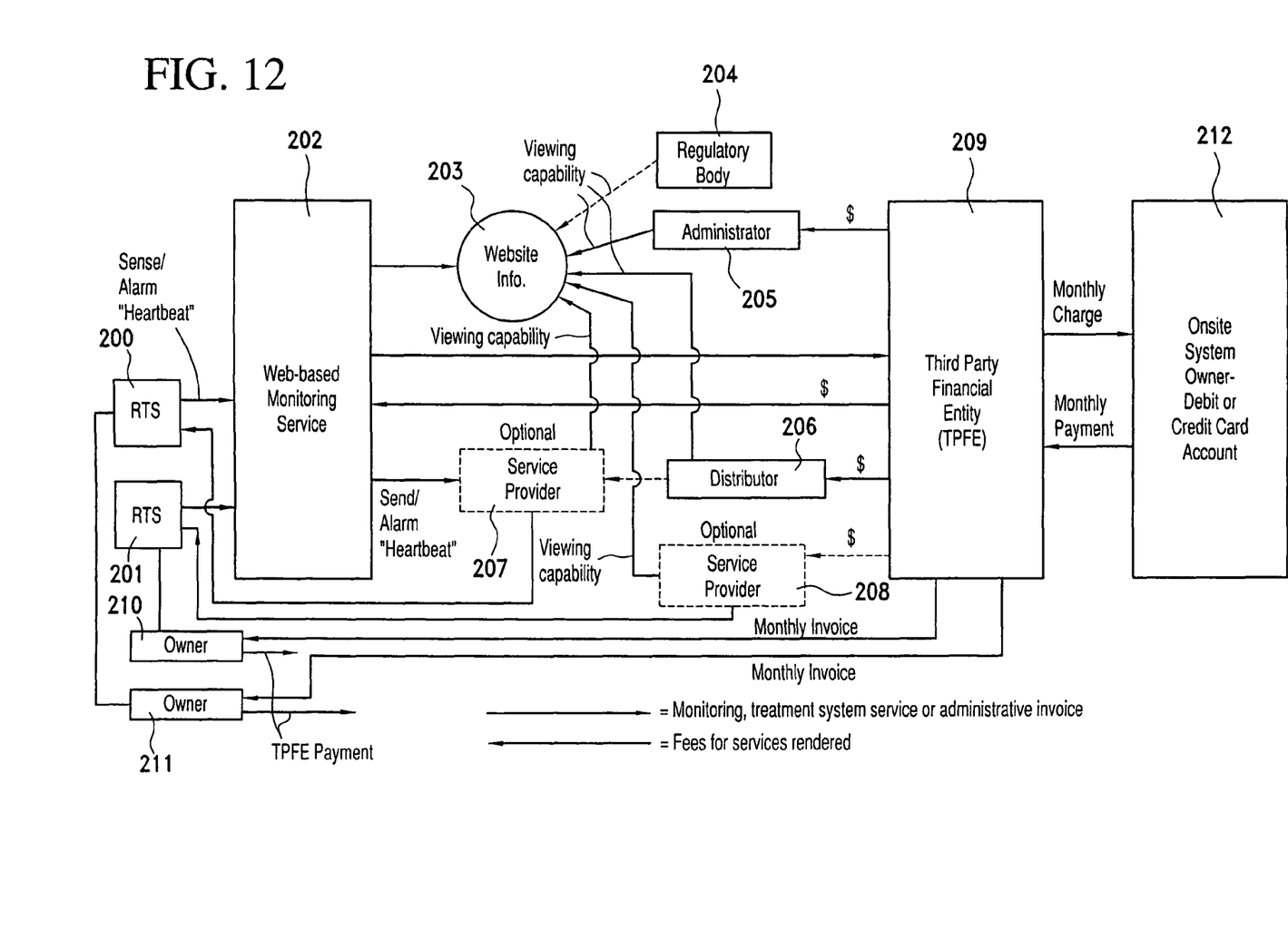
FIG. 12 is a block diagram illustrating a preferred payment system and method.

The control units of FIGS. 1, 2, and 4-11 may be adapted to communicate with a remote monitoring center such as monitoring center 212 illustrated in FIG. 12, that provides a website represented by the screen shot of FIG. 3 and a database to manage the information for the wastewater treatment system and auxiliary equipment. The remote monitoring center receives data transmitted by the control unit and posts it to the database. The website is preferably encrypted and password protected such that the database allows only authorized personnel access to information regarding the wastewater treatment system and auxiliary equipment, including general account and system information, operating status, service history, alarm history and service contract status. Reports can be generated for individual systems or all systems in a given category, status, and/or geographic area.

The ability to enter the secure website is preferably obtained through a unique user name and password that allows tiered access for system owners, service providers, licensed distributors or regulatory officials to access information on systems for which they are responsible.

FIG. 12 illustrates a preferred fee collection and distributing system and method of use with the embodiments described above. According to the preferred system and method, a plurality of residential treatment installations 200, 201 are connected to a monitoring service 202, which provides monitoring services for a fee. Information gathered by the monitoring service is provided to a website 203 for viewing by a regulatory body 204, an administrator 205, a distributor 206, and/or a service provider 207,208. Reference numeral 207 indicates a service provider that is owned by the distributor while reference numeral 208 indicates an independent service provider. Either service provider 207 or service provider 208 directly receives notice of an alarm condition from the monitoring service 202, initiating a service call.

According to the preferred embodiment illustrated in FIG. 12, fees are collected by a third party financial entity 209, which periodically bills respective owners 210,211 of respective installations 200,201 and distributes payments received from the owners, either directly by check or from a debit or credit card servicer 212. The payments are distributed to each of the entities involved in monitoring and servicing the installation, including monitoring service 202, administrator 205, service provider 207 via distributor 206, or service provider 208. As a result, the owner makes one convenient payment, and the various monitoring and servicing parties are not required to prepare and send out invoices or collect fees.

It will be appreciated that by those skilled in the art that any of the monitoring, distribution, administration, or service functions may be provided in whole or in part by one or more parties, and that payments may be distributed accordingly. In addition, it is to be understood that while FIG. 12 shows "monthly" charges and payments, the invention is not limited to monthly charges or payments.

Having thus described a preferred embodiment of the invention in sufficient detail to enable those skilled in the art to make and use the invention, it will nevertheless be appreciated that numerous variations and modifications of the illustrated embodiment may be made without departing from the spirit of the invention, and it is intended that the invention not be limited by the above description or accompanying drawings, but that it be defined solely in accordance with the appended claims.

What is claimed is:

1. A system for monitoring and controlling a wastewater treatment system, comprising:
   a remote monitoring center;
   at least one distributor or service provider; and
   a plurality of in situ control units, each including circuitry for carrying out monitoring and control functions and to provide alarms, and a built-in telemetry device for communication of alarm conditions to said remote monitoring center, said remote monitoring center notifying a respective one said at least one distributor or service provider when maintenance is required or when service is required in response to any of said alarm conditions, said remote monitoring center further notifying a financial entity of:
   (i) fees charged by each distributor or service provider that has provided services in response to a request from said remote monitoring center for maintenance or in response to notification by said remote monitoring center of any of said alarm conditions, and
   (ii) monitoring fees charged by said remote monitoring center,
   wherein respective single consolidated invoices are sent by said financial entity directly to each owner of said in situ control units, and wherein fees collected in reply to said single consolidated invoices are distributed by said financial entity directly to an operator of said remote monitoring center and directly to each distributor or service provider that has provided said services requested by said remote monitoring center.

2. A system as claimed in claim 1, further comprising an administrator, and wherein said fees are further distributed to said administrator.

3. A method for monitoring and controlling a wastewater treatment system, comprising the steps of:
   a remote monitoring center monitoring a plurality of in situ control units for individual wastewater treatment installations, said in situ control units including circuitry for carrying out monitoring and control functions and to provide alarms, and a built-in telemetry device for communication of alarm conditions to said remote monitoring center;

said remote monitoring center notifying a distributor or service provider when maintenance is required or when a specific one of said alarm conditions has been communicated to said remote monitoring center by said built-in telemetry device;

said remote monitoring center further notifying a financial entity of:
  (i) fees charged by each distributor or service provider that has provided services in response to a request from said remote monitoring center for maintenance or in response to communication of said one of said alarm conditions by said remote monitoring center, and
  (ii) monitoring fees charged by said remote monitoring center;

said financial entity directly billing, by a single consolidated invoice, each owner of said in situ control units for said fees charged by each distributor and service provider that has provided said services and for said monitoring fees;

said financial entity collecting payments reflective of the billing from owners of said in situ control units; and said financial entity distributing payments collected based on said single consolidated invoice directly to an operator of said remote monitoring center and directly to each said distributor and service provider that has provided services requested by said remote monitoring center.

4. A method as claimed in claim 3, further comprising the step of distributing said payments to an administrator.

5. A method as claimed in claim 3, wherein said payments are collected and distributed by a third party financial entity.

6. A method as claimed in claim 5, wherein said payments include payment for financial services provided by said third party financial entity.

* * * * *